United States Patent [19]

Olshansky et al.

[11] 4,229,070
[45] Oct. 21, 1980

[54] HIGH BANDWIDTH OPTICAL WAVEGUIDE HAVING $B_2O_3$ FREE CORE AND METHOD OF FABRICATION

[75] Inventors: Robert Olshansky, Addison; Arnab Sarkar, Painted Post, both of N.Y.

[73] Assignee: Corning Glass Works, Corning, N.Y.

[21] Appl. No.: 929,415

[22] Filed: Jul. 31, 1978

[51] Int. Cl.³ .................. G02B 5/14; C03B 37/075
[52] U.S. Cl. .................. 350/96.31; 65/3 A; 427/163
[58] Field of Search .......... 65/3 A; 427/163, 167; 350/96.31, 96.33

[56] References Cited

U.S. PATENT DOCUMENTS

| | | | |
|---|---|---|---|
| Re. 28,028 | 6/1974 | Maurer | 65/3 A |
| 3,711,262 | 1/1973 | Keck et al. | 65/3 A |
| 3,785,718 | 1/1974 | Gloge | 350/96.33 X |
| 3,823,995 | 7/1974 | Carpenter | 65/3 A X |
| 3,884,550 | 5/1975 | Maurer et al. | 65/3 A X |
| 4,087,266 | 5/1978 | Irven et al. | 65/3 A X |

OTHER PUBLICATIONS

*Vapor Deposition*, edited by C. F. Powell et al., 1966, pp. 3 & 259-263.

Primary Examiner—Richard V. Fisher
Attorney, Agent, or Firm—Walter S. Zebrowski; William J. Simmons, Jr.

[57] ABSTRACT

A method of forming a preform or blank for a high bandwidth gradient index optical filament, the preform itself and the resulting optical filament is disclosed. The preform which ultimately forms the optical filament includes a barrier layer between a tubular starting member which comprises the cladding and the core, the index of refraction of the barrier layer being equal to or less than the index of refraction of the tubular starting member; there being no step increase in the index of refraction of the barrier layer at the barrier layer-cladding interface nor of the core at the core-barrier layer interface of the optical filament. The tubular starting member is formed of a base glass and at least one dopant, the index of refraction of the tubular starting member being in excess of said base glass. The barrier layer is formed from a base glass and at least one dopant which is maintained substantially constant in the barrier layer. The core is formed of a base glass and at least one dopant which is gradually varied during the formation of the core, the core being free of $B_2O_3$.

13 Claims, 12 Drawing Figures

HIGH BANDWIDTH OPTICAL WAVEGUIDE HAVING $B_2O_3$ FREE CORE AND METHOD OF FABRICATION

BACKGROUND OF THE INVENTION

This invention relates to optical filament transmission media and, more particularly, to high bandwidth optical waveguides.

Waveguides used in optical communication systems are herein referred to as optical waveguides, and are normally constructed from a transparent dielectric material, such as glass or plastic.

Gradient index optical waveguides have a radially varying composition and consequently a radially varying refractive index. Reference is made to U.S. Pat. Nos. 3,823,995 to Carpenter and 3,711,262 to Keck and Schultz as examples of gradient index optical waveguides as well as examples of formation of optical waveguides by inside vapor phase oxidation processes. Both of these patents are expressly incorporated herein by reference. The inside vapor phase oxidation processes include chemical vapor deposition, flame hydrolysis and any other processes by which vaporous material is directed into a heated tube, reacted with oxygen under the influence of heat and deposited on the inside wall surface of said tube. The material is deposited within the tube in successive layers and the tube is then removed from the heat to leave a fused blank. As will be understood, the central hole may be collapsed at the end of the deposition process, the blank may subsequently be reheated and the hole collapsed, or the hole may be collapsed during the drawing process. In any event, the blank or preform is subsequently heated and drawn into an elongated, fine strand. Inasmuch as the structure of the drawn strand or filament reflects the structure of the drawing blank or preform, it is important that the physical characteristics of the blank be carefully controlled.

As is familiar to those skilled in the art, gradient index optical waveguides commonly exhibit a higher index of refraction in the core at center thereof; and lower indices of refraction at points radially outward from the core center. The gradient index of refraction may, however, be varied continuously or discontinuously, and may exhibit a linear, parabolic, or any other desired characteristic. Information concerning the construction and use of optical waveguides may be found in "Fiber Optics Principles and Applications" by N. S. Kapany, Academic Press, 1967; "Geometrical Optics of Parabolic Index Gradient Cylindrical Lenses" by F. P. Kapron, Journal of the Optical Society of America, Vol. 60, No. 11, pages 1433-1436, November, 1970; and "Cylindrical Dielectric Waveguide Mode" by E. Snitzer, Journal of the Optical Society of America, Vol. 51, No. 5, pages 491-498, May, 1961.

In order to effect such change of the index of refraction of a blank or preform being formed by an inside vapor phase oxidation process, the chemical composition of the source materials, which, after reaction, comprise the ultimate material deposited on the inside surface of the tube, may be varied. The vapor mixture is hydrolyzed or oxidized and deposited on the inside surface of the tube and subsequently fused to form a high quality and purity glass. At the same time, one or more additional vapors can be supplied to the tube, each vapor being constituted of a chemical termed a "dopant" whose presence affects the index of refraction or other characteristics of the glass being formed.

In general, optical waveguide blanks or preforms formed by the inside vapor phase oxidation process include forming a barrier layer on the inside of the support or substrate tube prior to the deposition of the core glass with the substrate tube being the cladding. The principal function of the barrier layer is to minimize interface scattering and absorption losses by removing the core-cladding interface which would exist between deposited layers of high purity, low attenuation glasses and the substrate tube inner surface. The barrier layer is conventionally a borosilicate glass composition since doping silica, which is generally the base glass, with boron reduces the deposition temperature and thereby minimizes shrinkage of the substrate tube. Other advantages of doping silica with boron is that it reduces the refractive index of the glass and it acts as a barrier to the diffusion of hydroxyl ions, commonly referred to as hydrogen or water, from the substrate tube to the deposited core glass at the elevated processing and drawing temperatures.

It is well known that the information bandwith of an optical waveguide filament can be substantially increased by grading the index of refraction profile. The bandwidth of a graded index of refraction optical waveguide can be from about 10 to $10^3$ times greater than the bandwidth of a filament with an ungraded index profile. The increase in bandwidth is very dependent on the shape of the index of refraction profile.

In the prior art formation of inside vapor phase oxidation gradient index optical waveguide preforms or blanks and the subsequent glass filaments, the filaments exhibit a combination step-graded index of refraction profile which causes pulse spreading of higher order modes resulting in lower bandwidth. Such a profile is illustrated in FIG. 1 where the gradient portion is indicated by curve 10 while the stepped portion is indicated by the substantially straight vertical portion 12 showing a step increase in the index of refraction.

Although not known to exist in the prior art, another example of a combination step-graded index of refraction profile which is believed to cause pulse spreading of higher order modes is illustrated in FIG. 2 where the gradient portion is indicated by curve 14 while the stepped portion is indicated by step 16, also showing a step increase in the index of refraction.

There are at least two causes of the step-graded profile illustrated in FIGS. 1 and 2. A high boron level is desired in the barrier layer for reasons discussed above. A low boron level is desired in the core to increase the numerical aperture of the resulting optical waveguide, to minimize Rayleigh scattering and to eliminate the infrared absorption of the B-O vibrational bands in the spectral range between 1.2 and 1.5 micrometers. (H. Osanai et al., Electronic Letters 12, 549, 1976.) The second reason for such a step-graded profile is that at the barrier layer-core interface a dopant such as $GeO_2$ and/or $P_2O_5$, or the like, must be introduced at a finite level set by the capability of the source material vapor delivery system. It should be noted that in the illustrations of both FIGS. 1 and 2, the index of refraction of the core at the barrier layer-core interface is higher, by a value of $\Delta n$, than the index of refraction of the substrate tube material or cladding. It is such a step increase in the core index of refraction at the barrier layer-core interface that is believed to produce the pulse spreading of higher order modes resulting in lower bandwidth. In each example, silica is shown as the substrate tube material having an index of refraction of 1.4570, with the index of refraction at the central axes 18 and 20 of the filaments of FIGS. 1 and 2 respectively being 1.4766. As will be understood, the indices of refraction are at a wavelength of about 630 nm. for a filament having a numerical aperture of about 0.24.

Curve 48 of FIG. 12 illustrates the pulse broadening which has been observed in a typical step-graded profile made by the prior art. The tall narrow portion of the pulse is produced by the graded part of the index of refraction profile, while the wide base extending to the right is caused by the step part of the profile. The bandwidth of the filament illustrated by curve 48 of FIG. 12 has been measured to be 260 mHz for a one kilometer length.

The method of the present invention avoids formation of the step part of the profile and results in the fabrication of pure graded index of refraction profiles such as those illustrated in FIG. 6 or 7. As illustrated by curve 52 of FIG. 12, a filament formed by the method of the present invention would have much less broadening and an estimated bandwidth of about 910 mHz for a one kilometer length. The reduced pulse broadening and high bandwidth are achieved by elimination of the step portion of the step-graded profile. In addition, the numerical aperture is increased, the Rayleigh scattering reduced, and the infrared absorption of the B-O vibrational bands in the spectral range between 1.2 and 1.5 micrometers is reduced.

A commonly used method of fabricating, for example, $GeO_2$-$SiO_2$-$B_2O_3$ or $SiO_2$-$GeO_2B_2O_3$-$P_2O_5$ core gradient index optical waveguides is illustrated in FIGS. 3 and 4 wherein the simultaneous reduction of the $B_2O_3$ level and the introduction of finite levels of $GeO_2$ alone and/or $P_2O_5$ causes a step increase in the refractive index at the edge of the core and leads to the step-gradient profile of FIG. 1 as hereinabove described. On the other hand, the method illustrated by FIG. 5, showing the second type of undesirable step-gradient profile illustrated in FIG. 2, results when finite levels of $GeO_2$ and/or $P_2O_5$ are used in the barrier layer together with $B_2O_3$, and the amount of $B_2O_3$ in the barrier layer is insufficient to compensate for the increase in the refractive index due to the amount of $GeO_2$ and/or $P_2O_5$ present. In such a situation, a step increase in the index of refraction is caused at the cladding-barrier layer interface which leads to the step-gradient index profile of FIG. 2.

As will be noted, FIGS. 3, 4 and 5 illustrate the starting source materials namely the chlorides or the like of boron, silicon, germania, and phosphorous. As will be understood these source materials, under the influence of oxygen and heat, react to produce the respective oxides. As used herein, inside vapor phase oxidation includes "chemical vapor deposition" and other vapor phase oxidation methods. The phrase "chemical vapor deposition" means the formation of deposits by chemical reactions which take place on, at, or near the deposition surface, a definition set forth on page 3 of the text "Vapor Deposition" edited by C. F. Powell et al., New York, John Wiley & Sons, Inc., 1966, which text is hereby wholly expressly incorporated by reference. Any of the procedural variations well known in the art may be employed to effect the deposition of the suitable coating of glass by the chemical vapor deposition process, such as, for example that described on page 263 of the aforementioned Powell et al. text which states: "Another means of obtaining uniform coverage which also can give high deposition efficiency, and which is especially applicable to the coating of the inside surfaces of small bore tubing, is to heat only a small portion of the tubing to the deposition temperature . . . . The section heated to the deposition temperature is slowly moved over the total length of the tube or the total area to be coated." In this connection, reference is also made to U.S. Pat. No. 3,031,338 issued on Apr. 24, 1962 to R. G. Bourdeau.

Another effective means of applying coatings by vapor phase oxidation is to sinter a soot layer of the desired material applied by flame hydrolysis process similar to that described in U.S. Pat. No. 2,272,342 issued to J. F. Hyde or U.S. Pat. No. 2,326,059 issued to M. E. Nordberg, both of which patents are expressly incorporated herein by reference.

SUMMARY OF THE INVENTION

It is an object of this invention to provide a method of forming a preform for a high bandwidth gradient index optical filament, the preform itself, and the resulting optical filament.

Another object of this invention is to provide a high bandwidth gradient index optical waveguide having low signal attenuation, a high numerical aperture, low Rayleigh scattering, a decreased infrared absorption of the B-O vibrational bands, and one which overcomes the disadvantages heretofore noted.

Briefly, according to this invention, a method of forming a preform for a high bandwidth, $B_2O_3$ free core gradient index optical filament, the preform itself, and the resulting optical filament is disclosed wherein a barrier layer is formed of a base glass and at least one dopant which is maintained substantially constant in the barrier layer. The barrier layer is formed on the inside surface of a tubular starting member which will comprise the cladding and which is formed of a base glass and at least one dopant, the index of refraction of the tubular starting member being in excess of said base glass. The barrier layer will be disposed between the starting member and the core, the index of refraction of the barrier layer being equal to or less than the index of refraction of the starting member; there being no step increase in the index of refraction of the barrier layer at the barrier layer-cladding interface nor of the core at the core-barrier layer interface of the optical filament. The core is formed of a base glass and at least one dopant which is gradually varied during the formation of the core, the core being free of $B_2O_3$.

These and additional objects, features and advantages of the present invention will become apparent to those skilled in the art from the following detailed description and the attached drawings, on which, by way of example, only the preferred embodiments of this invention are illustrated.

DETAILED DESCRIPTION OF THE INVENTION

It is to be noted that the drawings are illustrative and symbolic of the present invention and there is no intention to indicate scale or relative proportions of the elements shown therein. For purposes of simplicity, the present invention will be described in connection with the formation of high bandwidth gradient index optical waveguide preforms and the waveguides themselves wherein the base glass is silica although this invention is not intended to be limited thereto.

Application Ser. No. 929,416 entitled "High Bandwidth Optical Waveguides and Method of Fabrication" by R. Olshansky and A. Sarkar, filed simultaneously herewith, is related hereto and is expressly incorporated herein by reference.

Figure 6:
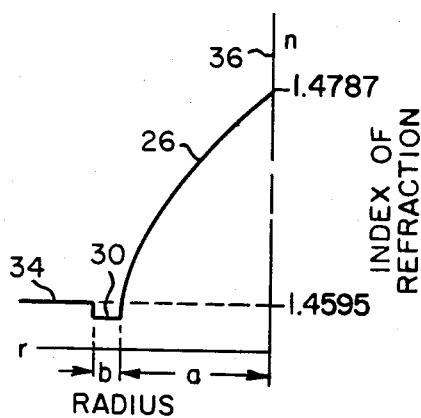
FIGS. 6 and 7 are graphical illustrations of high bandwidth gradient index optical filaments formed in accordance with the present invention.
Figure 7:
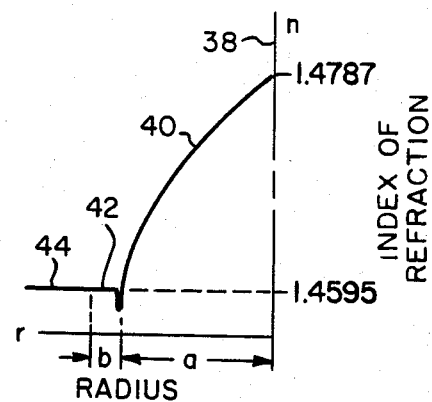
Figure 8:
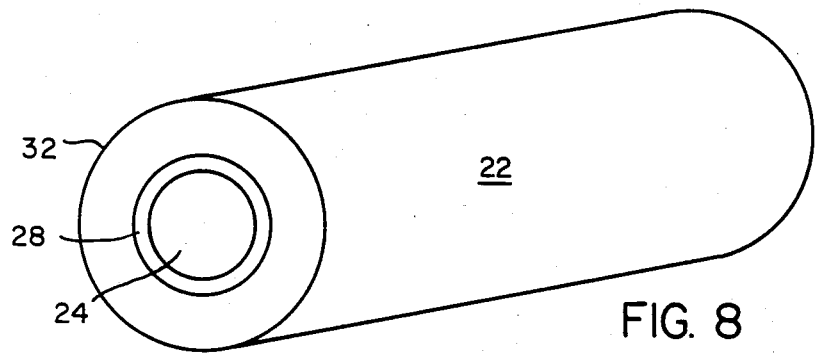
FIG. 8 is an oblique view of an optical waveguide in accordance with this invention.

Two examples of high bandwidth gradient index optical filaments made from preforms or blanks formed in accordance with the present invention are illustrated by FIGS. 6 and 7. FIG. 8 illustrates a typical optical waveguide 22 formed in accordance with the present invention. Referring to FIGS. 6 and 8, $B_2O_3$ free gradient index of refraction core 24 is indicated in FIG. 6 by curve 26 while the barrier layer 28 is indicated by flat portion 30. The starting member or substrate tube 32, which ultimately forms the waveguide cladding, is illustrated by flat portion 34 in FIG. 6. As will be understood, the barrier layer comprises the first deposited material on the inside surface of the substrate tube and is sometimes referred to as the deposited cladding. The substrate tube material used in the description of the present invention is silica base glass containing 2 mole percent $GeO_2$ as a dopant, wherefore, the index of refraction of the cladding portion illustrated in FIG. 6 is 1.4595 which is 0.0025 in excess of the index of refraction of the silica base glass. This is true for each of the illustrations set out in FIGS. 6, and 7 for purposes of simplicity of description and easy comparison. To further these aims, the index of refraction in each of these examples at the central axes 36 and 38 of the optical waveguides of FIGS. 6 and 7 respectively is approximately 1.4787, while the barrier layer thickness "b" of each is approximately 1 micrometer and the core radius "a" is approximately 31.25 micrometers.

The method of forming a preform or blank of the present invention as well as the optical filament itself may be any of various methods, such as for example, those described in the heretofore noted U.S. Pat. Nos. 3,823,995 and 3,711,262 which patents are hereby expressly incorporated by reference. Any other methods of forming gradient index optical waveguides are also suitable for the purposes of the present invention. Although any known method may be used to form the starting members or substrate tube, heretofore noted U.S. Pat. Nos. 3,823,995 and 3,711,262 describe methods of tube formation which are suitable for the present invention.

Figure 9:
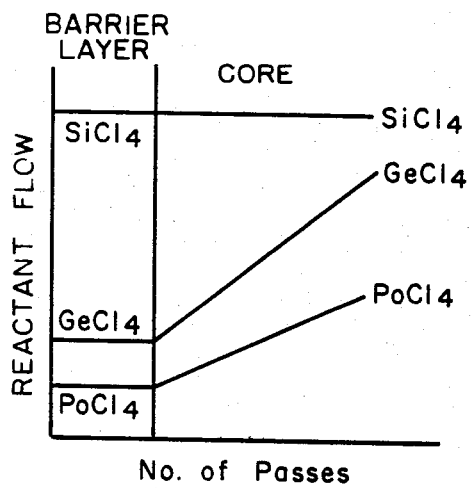
FIGS. 9 and 10 are graphical illustrations of the methods for introducing source vapor materials in the formation of high bandwidth optical filaments in accordance with the present invention.
Figure 10:
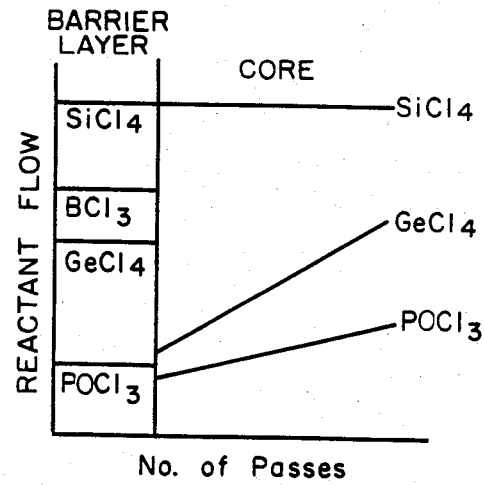

Referring to FIGS. 9 and 10, there are illustrated two methods of forming the high bandwidth gradient index $B_2O_3$ free core optical waveguides of FIGS. 6 and 7. As will be noted, FIGS. 9 and 10 illustrate the starting source materials, namely the chlorides or the like, of boron, silicon, phosphorous, and germania, which under the influence of oxygen and heat, react to produce the respective oxides. The base glass illustrated in FIGS. 9 and 10 is silica to which is selectively added $B_2O_3$, $GeO_2$ and $P_2O_5$. The starting member or substrate in each example is silica doped with $GeO_2$.

The barrier layer is formed by applying a plurality of layers of materials to the inside surface of the substrate tube, the composition of the barrier layer being substantially uniform throughout having a substantially constant proportion of silica, $P_2O_5$, $GeO_2$ and optionally $B_2O_3$. As illustrated in FIG. 9, the levels of $P_2O_5$ and $GeO_2$ in the barrier layer are maintained at levels whereby the barrier layer index of refraction is less than that of the base glass silica doped with $GeO_2$, as shown by flat portion 30 of FIG. 6. Specifically, the index of refraction of the barrier layer in the example illustrated in FIG. 6 is approximately 0.0004 lower than the index of refraction of the doped silica cladding. To obtain the gradient index core as illustrated by curve 26 of FIG. 6, the amounts of $GeO_2$ and $P_2O_5$ in the core material composition deposited over the barrier layer is gradually increased as each successive layer of core material is deposited. As will be understood, the core may be formed by the application of a plurality of layers of core material until the desired thickness of the core layer is achieved.

Since the barrier layer and the core each contain $P_2O_5$ and $GeO_2$ and there is no abrupt change in the amounts of these dopants, nor the abrupt introduction of a new dopant as the core is formed over the barrier layer, the resultant waveguide profile as illustrated in FIG. 6 does not have the step-gradient index profile of prior art waveguides. It will be understood that the change in the quantity of $P_2O_5$ and $GeO_2$ within the core thickness is programmed in a predetermined manner so as to obtain a predetermined desired cross-sectional profile of the ultimate optical waveguide.

Referring to FIG. 10, there is illustrated a method of forming the high bandwidth gradient index optical waveguide of FIG. 7. Referring additionally to FIG. 8, gradient index of refraction, $B_2O_3$ free core 24 is indicated in FIG. 7 by curve 40, while the barrier layer 28 is indicated by flat portion 42. The starting member or substrate tube 32, which ultimately forms the waveguide cladding, is illustrated by flat portion 44 in FIG. 7. As illustrated in FIG. 10, the levels of $B_2O_3$, $P_2O_5$ and $GeO_2$ in the barrier layer are maintained at levels whereby the barrier layer index of refraction is substantially equal to that of the $GeO_2$ doped silica starting member as shown by flat portion 42 of FIG. 7. To obtain the gradient index core as illustrated by curve 40 of FIG. 7, $B_2O_3$ is totally eliminated from the core material composition deposited over the barrier layer while the amount of $GeO_2$ and $P_2O_5$ is initially sharply decreased in the core composition and thereafter gradually increased in each successive layer. As will be understood, the core may be formed by the application of a plurality of layers of core material until the desired thickness of the core layer is achieved. Since $B_2O_3$ is totally eliminated from the core material and each of $GeO_2$ and $P_2O_5$ is sharply decreased as the first layer of core material is deposited over the barrier layer, there is an abrupt decrease in the index of refraction at the barrier layer-core interface as illustrated by the profile in FIG. 7. It is, therefore, seen that the resultant waveguide profile as illustrated in FIG. 7 does not have the step-gradient index profile with a step increase in the core index of refraction of prior art waveguides. It will be understood that the change in the quantity of $P_2O_5$ and $GeO_2$ within the core thickness is programmed in a predetermined manner so as to obtain a predetermined desired cross-sectional profile of the ultimate optical waveguide. It will also be understood that although the methods illustrated by FIGS. 9 and 10 to produce optical waveguides of FIGS. 6 and 7 have been described in connection with $B_2O_3$, $P_2O_5$ and $GeO_2$ as dopants, other dopants or combinations thereof may be used except that the core is free of $B_2O_3$. When other dopants or combinations thereof are used, the amounts of each must be properly programmed, as will be understood, so as to obtain a predetermined desired cross-sectional profile.

Figure 1:
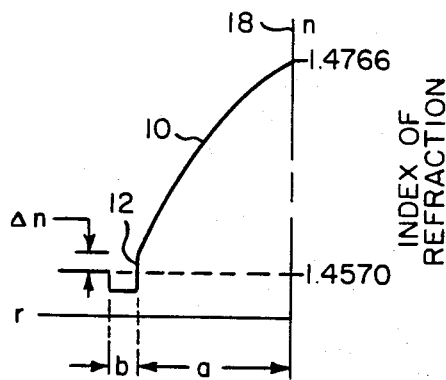
FIG. 1 is a graphical illustration of a prior art step-gradient index of refraction profile waveguide.
Figure 11:
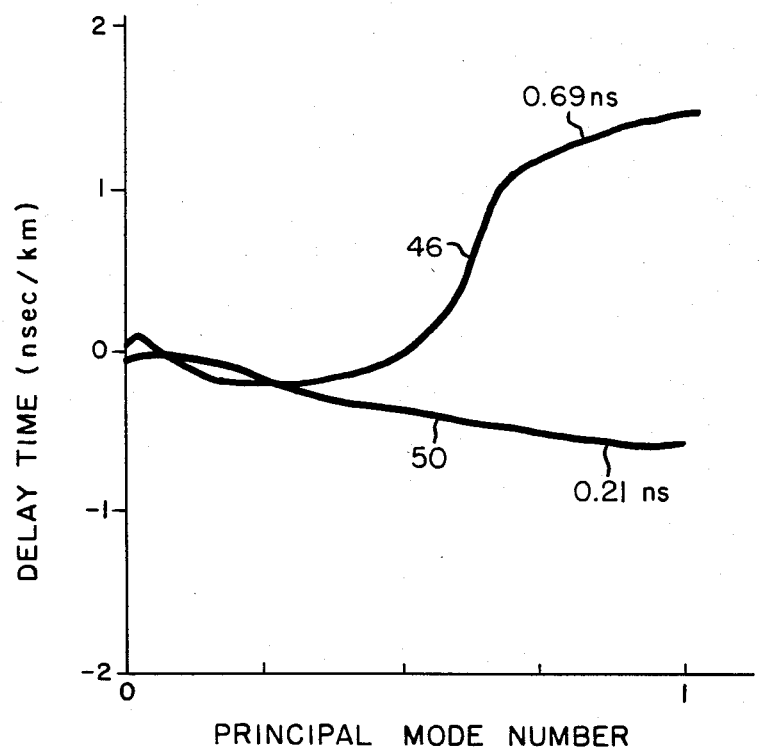
FIG. 11 is a graphical illustration of the principal mode number vs delay time of an optical waveguide which may be formed by the present invention as compared to a waveguide of the prior art.
Figure 12:
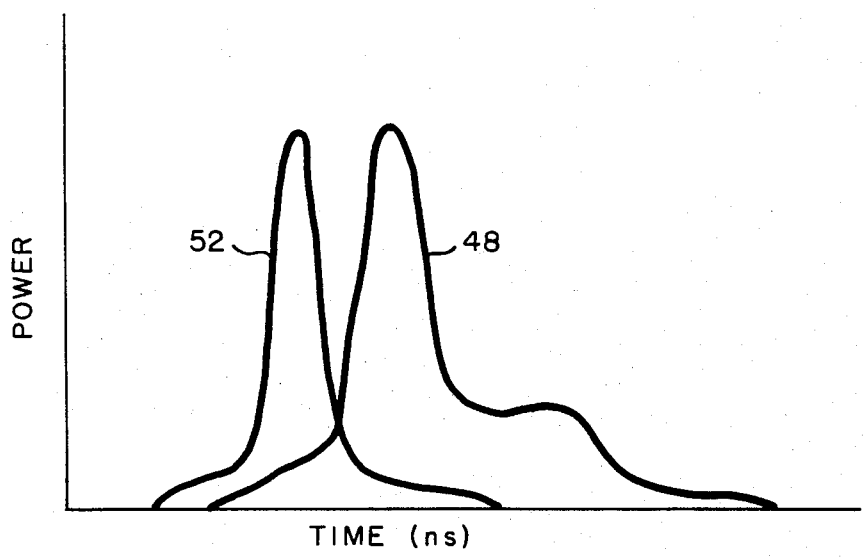
FIG. 12 is a graphical illustration of bandwidth represented by time vs power of an optical waveguide which may be formed by the present invention as compared to a waveguide of the prior art.

For a better understanding of the advantages produced by the present invention, reference is made to FIGS. 11 and 12. Curve 46 in FIG. 11 and curve 48 in FIG. 12 represent prior art data of an optical waveguide of the prior art such as is represented by FIG. 1, while curves 50 of FIG. 11 and 52 of FIG. 12 illustrate data of an optical waveguide of the present invention such as is represented by FIG. 6. It is to be understood that curve 50 of FIG. 11 and curve 52 of FIG. 12 are merely illustrations of data trends of the waveguides of the present invention and are not representative of measured data. Referring first to FIG. 11, the delay time in nanoseconds per kilometer is shown as a function of the principal mode number (m) for optical waveguides whose measured and illustrative data is represented by curves 46 and 50 respectively. As additional information for better understanding of the representation of FIG. 11, reference is made to an article entitled "Differential Mode Attenuation in Graded-Index Optical Waveguides" by Robert Olshanksy, published at page 423 of the Technical Digest of the 1977 International Conference on Integrated Optics and Optical Fiber Communications, Tokyo, Japan, which article is hereby expressly incorporated by reference. The principal mode number "m" is related to the launch position "r" of a laser spot at the input end of a fiber by the equation $$m = M(r/a)^2$$

where "a" is the core radius and "M" is the maximum value of the principal mode number, given by $$M = \tfrac{1}{2} n_1 ka \sqrt{2\Delta}$$

where "$n_1$" is the on-axis index of refraction, "k" is equal to $2\pi/\lambda$, $\lambda$ is the free space wavelength (799 nm for the data shown in FIG. 11), "$n_2$" is the index of refraction of the cladding, and $\Delta$ equals $(n_1 - n_2)/(n_1)$.

Because of the step increase in the index of refraction profile at the core-barrier layer interface of the waveguide represented by FIG. 1, a large delay time shift results for high order modes transmitted through such a waveguide and consequently a large rms pulse width of 0.69 ns is produced as seen from measured curve 46 of FIG. 11. When the index of refraction profile shape is corrected according to the present invention as represented by FIG. 6, the delay shift as illustrated by curve 46 of FIG. 11 is eliminated as demonstrated by illustrative and representative curve 50. It is seen that the rms pulse broadening as represented by the curve 50 of FIG. 11 is reduced to about 0.21 ns.

Referring additionally to FIG. 12 where curve 48 represents data of the prior art optical waveguide illustrated by FIG. 1, the pulse width "$\sigma$" of 0.69 ns is mathematically translated to a bandwidth of 0.28 GHz. The measured bandwidth was 260 mHz. On the other hand, the optical waveguide of the present invention of FIG. 6 illustrated by curve 50 of FIG. 11 and curve 52 of FIG. 12 having a rms pluse width "$\sigma$" of about 0.21 ns is mathematically translated to a bandwidth of about 0.95 GHz.

Figure 2:
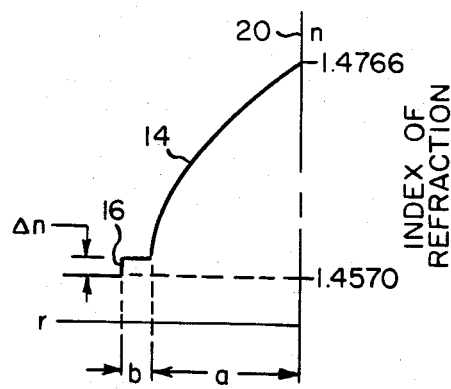
FIG. 2 is a graphical illustration of another step-gradient index of refraction profile, low bandwidth waveguide.
Figure 3:
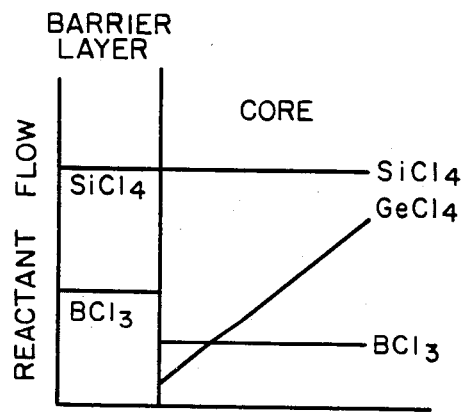
FIGS. 3 and 4 are graphical illustrations of the methods of prior art introduction of source vapor materials in the formation of step-gradient index of refraction profile optical waveguides.
Figure 4:
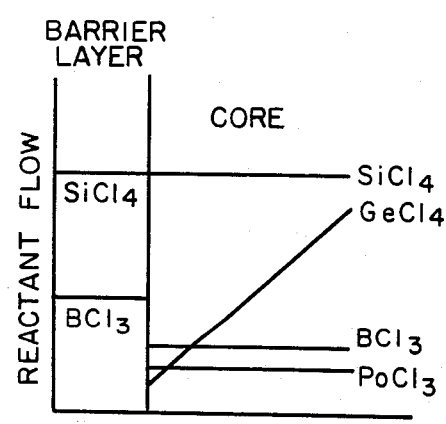
Figure 5:
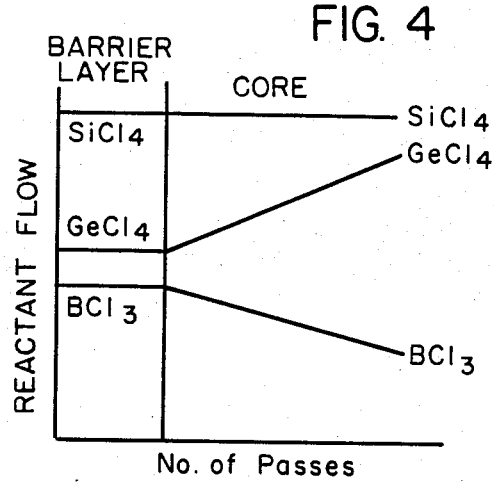
FIG. 5 is a graphical illustration of a method of introducing source vapor materials in the formation of the step-gradient index of refraction profile waveguide of FIG. 2.

For comparison and informational purposes, the chemical vapor deposition process data represented by FIGS. 3 and 4 which produced optical waveguides of the prior art represented by FIG. 1, and the calculated process data represented by FIG. 5 which is believed to produce an optical waveguide represented by FIG. 2, is set out in Table I, following. The data of the example of FIGS. 1 and 4 is illustrated by curve 46 of FIG. 11 and curve 48 of FIG. 12.

TABLE I

| EX. | REACTANT | BARRIER LAYER REACTANT FLOW | CORE REACTANT FLOW |
|---|---|---|---|
| FIGS. 1 & 3 | $SiCl_4$ | 0.6 gms/min | 0.6 gms/min |
|  | $GeCl_4$ | — | 0.05 to 0.465 gms/min |
|  | $BCl_3$ | 20 scc/min | 5 scc/min |
| FIGS. 1 and 4 | $SiCl_4$ | 0.6 gms/min | 0.6 gms/min |
|  | $GeCl_4$ | — | 0.05 to 0.465 gms/min |
|  | $POCl_3$ | — | 0.049 gms/min |
|  | $BCl_3$ | 20 scc/min | 5 scc/min |
| FIGS. 2 & 5 | $SiCl_4$ | 0.6 gms/min | 0.6 gms/min |
|  | $GeCl_4$ | 0.2 gms/min | 0.2 to 0.465 gms/min |
|  | $BCL_3$ | 20 scc/min | 20 to 5 scc/min |

For each of the examples of Table I the excess oxygen is 1000 scc/min, temperature is 1750° C. and the transverse rate of layer application is 15 cm/min for both the barrier layer and core; the barrier layer is formed by 3 passes or layers while the core is formed by 60 passes or layers. The resulting optical waveguide has an outside diameter of about 125 micrometers, a core diameter of about 62.5 micrometers, and a barrier layer thickness of about 1 micrometer, although the barrier layer may range from about 1 to 10 micrometers if desired.

The following is a typical example of how an optical waveguide having a profile as illustrated in FIG. 6 and formed by the method illustrated in FIG. 9 of the present invention may be produced. A silica substrate tube containing 2 mole percent $GeO_2$ and having an outside diameter of 25 millimeters and a wall thickness of 1.275 millimeters is mounted in a deposition lathe well known in the art. The constituent reactants SiCl₄, GeCl₄, and POCl₃ are delivered to the substrate tube by a chemical vapor deposition system well known to one familiar with the art, specifically, reference is made in this regard to the teaching of the Aslami application noted heretofore, Application Ser. No. 855,215 by M. G. Blankenship which is incorporated herein by reference, and copending patent application entitled "Method of Making Large Diameter Optical Waveguide Preforms" by A. Sarkar, Ser. No. 913,754, which copending application is also incorporated herein by reference. Illustrative parameters of the process of this example have been mathematically calculated and estimated to be as set out in Table II following.

TABLE II

| EX. | REACTANTS | BARRIER LAYER REACTANT FLOW | CORE REACTANT FLOW |
| --- | --- | --- | --- |
| FIGS. 6 & 9 | SiCl₄ | 0.6 gms/min | 0.6 gms/min |
|  | GeCl₄ | 0.04 gms/min | 0.04 to 0.46 gms/min |
|  | POCl₃ | 0.0059 gms/min | 0.0059 to 0.20 gms/min |

For the example of Table II the excess oxygen provided is about 1000 scc/min, the forming temperature is about 1750° C., and the transverse rate of layer application is about 15 cm/min for both the barrier layer and core; the barrier layer being formed by 3 passes or layers while the core is formed by 60 passes or layers.

The blank or preform so formed is then heated to a temperature of about 2200° C., rotated at a speed of 60–90 rpm, and the central hole is collapsed to form a solid preform. The solid preform is then mounted in a drawing apparatus as well known in the art, the end thereof heated to a temperature of about 2000° C. and drawn into an optical waveguide filament having the cross-sectional profile as illustrated in FIG. 6 and a data trend as illustrated by curve 50 of FIG. 11 and curve 52 of FIG. 12. The resulting optical waveguide would have an outside diameter of about 125 micrometers, a core diameter of about 62.5 micrometers, and a barrier layer thickness of about 1 micrometer. The silica cladding containing 2 mole percent GeO₂ would have an index of refraction of about 1.4595, the barrier layer containing 1 mole percent of each of GeO₂ and P₂O₅ with the balance being silica would have an index of refraction of about 1.4591, and the core at the central axis 36 containing about 15 mole percent GeO₂ and about 4 mole percent P₂O₅ with the balance being silica would have an index of refraction of about 1.4787.

Another example of the present invention employs the same delivery system and chemical vapor deposition lathe as described in connection with the previous example. A silica tube containing 2 mole percent GeO₂ and having a 25 millimeter outside diameter and a 1.275 millimeter wall thickness is provided and mounted in said lathe. The method parameters for forming an optical waveguide having an index of refraction profile as illustrated in FIG. 7 by the process illustrated by FIG. 10 have been mathematically calculated and estimated to be as set out in Table III following.

TABLE III

| EX. | REACTANTS | BARRIER LAYER REACTANT FLOW | CORE REACTANT FLOW |
| --- | --- | --- | --- |
| FIGS. 7 & 10 | SiCl₄ | 0.6 gms/min | 0.6 gms/min |
|  | GeCl₄ | 0.23 gms/min | 0.02 to 0.46 gms/min |
|  | POCl₃ | 0.05 gms/min | 0.044 to 0.20 gms/min |
|  | BCl₃ | 30 scc/min | None |

For the example of Table III the excess oxygen provided is about 1000 scc/min, the forming temperature is about 1750° C., and the transverse rate of layer application is about 15 cm/min for both the barrier layer and core; the barrier layer being formed by 3 passes or layers while the core is formed by 60 passes or layers.

After the preform or blank is fabricated as heretofore described, it is heated to a temperature of about 2200° C., rotated at a speed of 60–90 rpm, and the central hole is collapsed to form a solid preform. The article so formed is subsequently placed in a drawing apparatus known to one familiar with the art, the end thereof heated and a fiber having an outside diameter of about 125 micrometers, a core diameter of about 62.5 micrometers, and a barrier layer thickness of about 1 micrometer is drawn in a manner well known in the art. The waveguide so formed should have an index of refraction profile as illustrated by FIG. 7. The silica cladding containing 2 mole percent GeO₂ would have an index of refraction of about 1.4595, the barrier layer containing 5.7 mole percent GeO₂, 1 mole percent P₂O₅ and 10 mole percent B₂O₃ with the balance silica would also have an index of refraction not in excess of about 1.4595, the first core pass or layer containing 1 mole percent of each of GeO₂ and P₂O₅ with the balance silica would have an index of refraction of 1.4591 and the core at the central axis 38 containing about 15 mole percent GeO₂ and about 4 mole percent P₂O₅ with the balance silica would have an index of refraction of about 1.4787.

As will be understood, the central hole of any of the waveguide preforms or blanks of the preceding examples may be collapsed at the end of the deposition process as described, or the blank may be subsequently reheated and the hole collapsed, or the hole may be collapsed during the drawing process as desired.

Although the present invention has been described with respect to specific details of certain embodiments thereof, it is not intended that such details be limitations upon the scope of the invention except insofar as set forth in the following claims.

We claim:

1. A method of forming a preform for a high bandwidth optical filament comprising the steps of providing a cylindrical tubular starting member formed of a base glass and at least one dopant, the index of refraction of said tubular starting member being in excess of the index of refraction of said base glass, forming a barrier layer on the inside wall surface of said tubular starting member consisting essentially of a base glass and at least one additional dopant, maintaining the quantity of said base glass and dopant within said barrier layer substantially uniform throughout the thickness of said barrier layer, the index of refraction of said barrier layer being equal to or less than the index of refraction of said tubular starting member, forming a $B_2O_3$ free core layer having a gradient index of refraction over said barrier layer thereby forming an interface therebetween, said core layer having at said interface an index of refraction approximately equal to or less than that of said barrier layer, there being no step increase in the index of refraction of the core at said interface, said $B_2O_3$ free core layer consisting essentially of a high purity base glass and at least one dopant, and varying the quantity of said one or more dopants gradually from said interface towards the preform central axis in a predetermined manner so as to result in a desired gradient index of refraction across the cross section of said core layer.

2. The method of claim 1 wherein said cylindrical tubular starting member is silica containing $GeO_2$.

3. The method of claim 1 wherein said dopants are at least one dopant selected from the group consisting of $GeO_2$ and $P_2O_5$.

4. The method of claim 1 wherein one of said dopants in said barrier layer is $B_2O_3$.

5. The method of claim 1 further comprising the step of collapsing the central hole of the preform to form a solid article.

6. The method of forming a high bandwidth optical filament comprising the steps of providing a cylindrical tubular starting member formed of a base glass and at least one dopant, the index of refraction of said tubular starting member being in excess of the index of refraction of said base glass, forming a barrier layer on the inside wall surface of said tubular starting member consisting essentially of a base glass, and at least one additional dopant, maintaining the quantity of said base glass and dopant within said barrier layer substantially uniform throughout the thickness of said barrier layer, the index of refraction of said barrier layer being equal to or less than the index of refraction of said tubular starting member, forming a $B_2O_3$ free core layer having a gradient index of refraction over said barrier layer thereby forming an interface therebetween, said core layer having at said interface an index of refraction approximately equal to or less than that of said barrier layer, there being no step increase in the index of refraction of the core at said interface, said $B_2O_3$ free core layer consisting essentially of a high purity base glass and at least one dopant, simultaneously varying the quantity of said one or more dopants gradually from said interface toward the central axis of the article so formed in a predetermined manner so as to result in a desired gradient index of refraction across the cross section of said core layer, heating the article so formed to a temperature sufficient to collapse the central hole thereby forming a solid preform, heating the structure so formed to the drawing temperature of the materials thereof, and drawing the heated structure to reduce the cross section of area thereof to form an optical filament having predetermined desired characteristics.

7. The method of claim 6 wherein said cylindrical tubular starting member is silica containing $GeO_2$.

8. The method of claim 6 wherein said dopants are at least one dopant selected from the group consisting of $GeO_2$ and $P_2O_5$.

9. The method of claim 6 wherein one of said dopants in said barrier layer is $B_2O_3$.

10. A high bandwidth gradient index optical filament comprising an outer cladding layer, a barrier layer having an index of refraction equal to or less than said cladding layer disposed on the insdie wall surface of said cladding layer, said barrier layer consisting essentially of a base glass and at least one dopant, the quantity of each of said base glass and dopant being substantially uniform throughout the thickness of said barrier layer, and a $B_2O_3$ free core of high purity glass having a gradient index of refraction disposed within said barrier layer and adhered thereto to form an interface therebetween, said core having an index of refraction equal to or less than said barrier layer at said interface there being no step increase in the index of refraction of the core at said interface, said core consisting essentially of a base glass, and at least one dopant, the quantity of said one or more dopants gradually varying from said interface towards said central axis in a predetermined manner so as to result in a desired substantially continuously varying gradient index of refraction across the cross section of said core.

11. The high bandwidth gradient index optical filament of claim 10 wherein said cladding layer is composed of silica containing $GeO_2$.

12. The high bandwidth gradient index optical filament of claim 10 wherein said dopants are at least one dopant selected from the group consisting of $GeO_2$ and $P_2O_5$.

13. The high bandwidth gradient index optical filament of claim 10 wherein one of said dopants in said barrier layer is $B_2O_3$.

* * * * *

UNITED STATES PATENT AND TRADEMARK OFFICE
CERTIFICATE OF CORRECTION

PATENT NO. : 4,229,070
DATED : October 21, 1980
INVENTOR(S) : Robert Olshansky and Arnab Sarkar It is certified that error appears in the above-identified patent and that said Letters Patent are hereby corrected as shown below:

Figure 4, "$PoCl_3$" should be -- $POCl_3$ --.

Figure 9, "$PoCl_4$" should be -- $POCl_3$ --, two occurrances.

Figures 3 and 4, insert -- (PRIOR ART) -- beneath each of the Figures.

Column 3, line 32, "$SiO_2-GeO_2B_2O_3-P_2O_5$" should be -- $SiO_2-GeO_2-B_2O_3-P_2O_5$ --.

Column 8, line 48, "$BCL_3$" should be -- $BCl_3$ --.

Column 12, line 24, "insdie" should be -- inside --.

Signed and Sealed this

Thirtieth Day of December 1980

[SEAL]

Attest:

SIDNEY A. DIAMOND

Attesting Officer

Commissioner of Patents and Trademarks